United States Patent
Jung et al.

(10) Patent No.: US 12,475,975 B2
(45) Date of Patent: Nov. 18, 2025

(54) ANALYTICAL DEVICE FOR PERFORMING SINGLE CELL ANALYSIS ON TUMOR USING ARTIFICIAL INTELLIGENCE, AND METHOD USING THE SAME

(71) Applicant: WITTGEN BIOTECHNOLOGIES INC., Seoul (KR)

(72) Inventors: Minwoo Jung, Seoul (KR); Sangyoun Rhie, Gwangju-si (KR)

(73) Assignee: WITTGEN BIOTECHNOLOGIES INC., Seoul (KR)

( * ) Notice: Subject to any disclaimer, the term of this patent is extended or adjusted under 35 U.S.C. 154(b) by 0 days.

(21) Appl. No.: 18/023,373

(22) PCT Filed: Feb. 23, 2023

(86) PCT No.: PCT/KR2023/002573
§ 371 (c)(1),
(2) Date: Feb. 26, 2023

(87) PCT Pub. No.: WO2024/177173
PCT Pub. Date: Aug. 29, 2024

(65) Prior Publication Data
US 2025/0061974 A1    Feb. 20, 2025

(30) Foreign Application Priority Data
Feb. 23, 2023    (KR) ........................ 10-2023-0022552

(51) Int. Cl.
*G16B 40/30* (2019.01)
*G16B 20/10* (2019.01)
(Continued)

(52) U.S. Cl.
CPC ............. *G16B 40/30* (2019.02); *G16B 20/10* (2019.02); *G16B 20/20* (2019.02); *G16H 50/20* (2018.01)

(58) Field of Classification Search
CPC ........ G16B 40/30; G16B 20/10; G16B 20/20; G16B 25/10; G16B 40/00; G16B 40/20;
(Continued)

(56) References Cited

U.S. PATENT DOCUMENTS

2021/0151123 A1* 5/2021 Araya ............... G06F 18/24133
2021/0319907 A1* 10/2021 Harley ................... G16H 50/70
(Continued)

FOREIGN PATENT DOCUMENTS

KR    20170072685 A    6/2017

OTHER PUBLICATIONS

Mahin et al., PanClassif: Improving pan cancer classification of single cell RNA-seq gene expression data using machine learning, Genomics, vol. 114, Issue 2, 2022, 110264, ISSN 0888-7543, https://doi.org/10.1016/j.ygeno.2022.01.001. (Year: 2022).*

(Continued)

*Primary Examiner* — Joy Chng
(74) *Attorney, Agent, or Firm* — STIP Law Group, LLC (57) ABSTRACT

A device and method are disclosed for performing single-cell tumor analysis using artificial intelligence. Single-cell RNA sequencing data is obtained from a tumor sample of a patient, and pre-processed to remove low-quality or redundant data. Cell types are classified based on gene expression, and tumor subtypes and grades are predicted using trained machine learning models. The system also detects phenotypic heterogeneity within the tumor and generates personalized analysis reports that may include prognosis, metastasis likelihood, and treatment recommendations. This approach enables precision oncology at single-cell resolution through automated data-driven analysis.

10 Claims, 9 Drawing Sheets

(51) Int. Cl.
*G16B 20/20* (2019.01)
*G16H 50/20* (2018.01)

(58) Field of Classification Search
CPC ........ G16B 20/00; G16B 30/00; G16H 50/20; G16H 15/00; G16H 50/50; G16H 70/60; G06N 20/00
USPC .......................................................... 705/2–3
See application file for complete search history.

(56) References Cited

U.S. PATENT DOCUMENTS

2022/0389511 A1* 12/2022 Kelley ................ G06F 18/2414
2022/0405919 A1* 12/2022 Yip ........................ G06N 3/084

OTHER PUBLICATIONS

Third party observation and Cited document published of PCT/KR2023/002573 from World Intellectual Property Organization, Jun. 19, 2025.
Third Party observation of PCT/KR2023-002573 form World Intellectual Property Organization, Jun. 19, 2025.

* cited by examiner

ANALYTICAL DEVICE FOR PERFORMING SINGLE CELL ANALYSIS ON TUMOR USING ARTIFICIAL INTELLIGENCE, AND METHOD USING THE SAME

CROSS-REFERENCE TO RELATED APPLICATIONS

This application is the U.S. National Phase under 35 U.S.C. § 371 of International Application No. PCT/KR2023/002573, filed on Feb. 23, 2023, which in turn claims the benefit of Korean Application No. 10-2023-0022552, filed on Feb. 21, 2023, the disclosures of which are incorporated by reference into the present application.

TECHNICAL FIELD

The present invention relates to a method for accurately analyzing a single cell by providing phenotypes derivable from RNA expression of tumor cells in a tumor sample taken from a patient and then providing an analysis result on the basis of a single cell unit. More specifically, the present invention relates to an analytical device for performing analysis on a single cell of a tumor using artificial intelligence, and a method using the same. This application claims priority to and the benefit of Korean Patent Application No. 10-2023-0022552 filed in the Korean Intellectual Property Office on Feb. 21, 2023, the entire contents of which are incorporated herein by reference.

BACKGROUND ART

Cancer is the most common disease in South Korea. The rate of progression of cancer varies depending on the type of cancer, and it is extremely difficult to cure the cancer if the cancer develops and spreads to other organs.

In the current clinical environments, classification of gene phenotypes of a tumor is made by the sum of all genes obtained from cancer cells, immune cells and other stromal cells and the like constituting the tumor. In addition, for cancer cells, new mutations occurring in cell division and changes in environment may cause cancer cells of different phenotypes to coexist in one tumor. That is, if tumor characteristics such as a subtype and a grade of cancer are classified on the basis of a tumor, there is a limitation in selecting an appropriate treatment method and drug for cancer cells of different characteristics in the same tumor.

With the development of artificial intelligence technology, there are various attempts to utilize the artificial intelligence in the medical field as well. In particular, there is a need to utilize previously accumulated data so as to more accurately analyze tumor samples taken from patients with cancer on the basis of a single cell unit.

In this regard, Korean Patent Application Publication No. 10-2017-0072685 has been disclosed.

DISCLOSURE

Technical Problem

The embodiments disclosed in the present invention have been proposed to solve the above-mentioned problems, and the objective thereof is to provide is to classify inputs, obtained after analyzing a tumor sample on the basis of a single cell unit, into groups of subtypes through machining, classifying a grade, and prescribe appropriate treatments and drugs according to prognosis.

The problems to be solved by the present invention are not limited to the aforementioned problems, and other problems not mentioned may be clearly understood by those skilled in the art from the following description.

Technical Solution

In order to achieve the above-described technical object, according to an aspect of the present invention, there is provided a single cell analysis device for analyzing a tumor using artificial intelligence, the device including, a memory, and a processor, and the processor is configured to acquire single cell data on a tumor of a particular patient through the communication part; pre-process the single cell data on the tumor through a data pre-processing module; classify a type of the single cell based on the data pre-processed by a cell type defining module; predict a phenotype derivable from RNA expression of the tumor of the particular patient through a single-cell state predicting module materialize heterogeneity of the tumor of the particular patient through the tumor analyzing module; and report and provide an analysis result of the tumor of the particular patient through an analysis result generating module.

In addition, the method for analyzing a single cell according to the present invention may be further provided.

In addition, a system including a server and devices to perform a method for implementing the present invention may be further provided.

Advantageous Effects

According to various embodiments of the present invention, a single patient with cancer may be found as having a plurality of phenotypes for subtypes of cancer that can be variously classified, and the cancer may be predicted or classified through machine learning as a non-existing group or as an existing group, and analysis result data including information of treatments, drugs, and the like are provided.

In addition, according to various embodiments of the present invention, by identifying and diagnosing a tumor on the basis of a single cell unit and determining a grade of the tumor more accurately, it is possible to create an opportunity to apply multiple treatments and multiple drugs, predict information on metastasis through learning, and provide customized information on an individual patient.

Effects of the present invention are not limited to the aforementioned effects, and other effects not mentioned herein will be clearly understood by those skilled in the art from the following description.

MODES FOR THE INVENTION

Throughout the present invention, like reference numerals refer to like elements. In the present invention, all elements of embodiments are not explained, but general matters in the technical field of the present invention or redundant matters between embodiments of the present invention will not be described. Terms 'part', 'module', 'member', and 'block' used in the specification may be implemented using software or hardware, and, according to embodiments of embodiments disclosure, a plurality of 'parts', 'modules', 'members', or 'blocks' may be implemented using a single unit or element, or a single 'part', 'module', 'member', or 'block' may be implemented using a plurality of units or elements.

Throughout the specification, it will be understood that when an element is referred to as being "connected" to another element, it may be "directly connected" to the other element or "electrically connected" to the other element with intervening elements therebetween.

It will be further understood that when a part "includes" or "comprises" an element, unless otherwise defined, the part may further include other elements, not excluding the other elements.

In the present specification, a description of a certain member being placed "on" another member includes not only a case of the one member adjoining the member but a case of still another member being present between the two members.

It will be understood that, although the terms first, second, etc., may be used herein to describe various elements, it should not be limited by these terms.

The singular forms "a," "an" and "the" are intended to include the plural forms as well, unless the context clearly indicates otherwise.

An identification code is used for the convenience of the description but is not intended to illustrate the order of each step, and each of the steps may be implemented in an order different from the illustrated order unless the context clearly indicates otherwise.

The operational principle of the disclosure and embodiments thereof will now be described more fully with reference to the accompanying drawings.

In this specification, a "device according to the present invention" includes various devices capable of performing computational processing to provide results to a user. For example, a device according to the present invention may include all of a computer, a server device, and a portable terminal, or may be any one of the computer, the server device, and the portable terminal.

Here, the computer may include, for example, a notebook, a desktop, a laptop, a tablet PC, a slate PC, or the like equipped with a Web Browser.

The server device, which is a server that performs communication with an external device to process information, may include an application server, a computing server, a database server, a file server, a game server, a mail server, a proxy server, a web server, and the like.

The portable terminal is a wireless communication device with guaranteed portability and mobility, and may include, for example, all kinds of handheld-based wireless communication devices, such as Personal Communication System (PCS), Global System for Mobile communications (GSM), Personal Cellular (PDC), Personal Handyphone System (PHS), Personal Digital Assistant (PDA), International Mobile Telecommunication (IMT)-2000, Code Division Multiple Access (CDMA)-2000, W-Code Division multiple Access (W-CDMA), Wireless Broadband Internet (WiBro) terminal, and Smart phone, and may also include wearable devices such as watch, ring, bracelet, balm, necklace, glasses, contact lens, or head-mounted device (HMD).

The single cell analysis device according to various embodiments of the present invention may be a server that performs a single cell analysis process on a tumor using artificial intelligence. Specifically, a single cell analysis device of the present invention may be a platform operating server that provides a single cell analysis process service. For example, the single cell analysis device includes a device that uses artificial intelligence to analyze each of multiple cells constituting a sample of a tumor taken by a doctor working in a hospital or the like.

The single cell analysis device according to various embodiments of the present invention may include a high-specification CPU and/or GPU as a component. Here, the high-specification CPU and GPU are not limited as long as the CPU and GPU can perform various processes, performed in the present invention, without latency. In addition, the single cell analysis device of the present invention may be a general server for operating and managing a platform that provides a single cell analysis process service. Accordingly, the single cell analysis device of the present invention may learn prototypes (e.g. references) for tumors (especially tumors having cancer cells) through various machine learning models, and classify and analyze single-cell data on a tumor of a particular patient based on the prototypes. The machining models may be updated through repeated learning, and the analysis device may further perform supervised and/or non-supervised learning through artificial intelligence and derive a new subtype of cancer cell and a grade of cancer cell.

Figure 1:
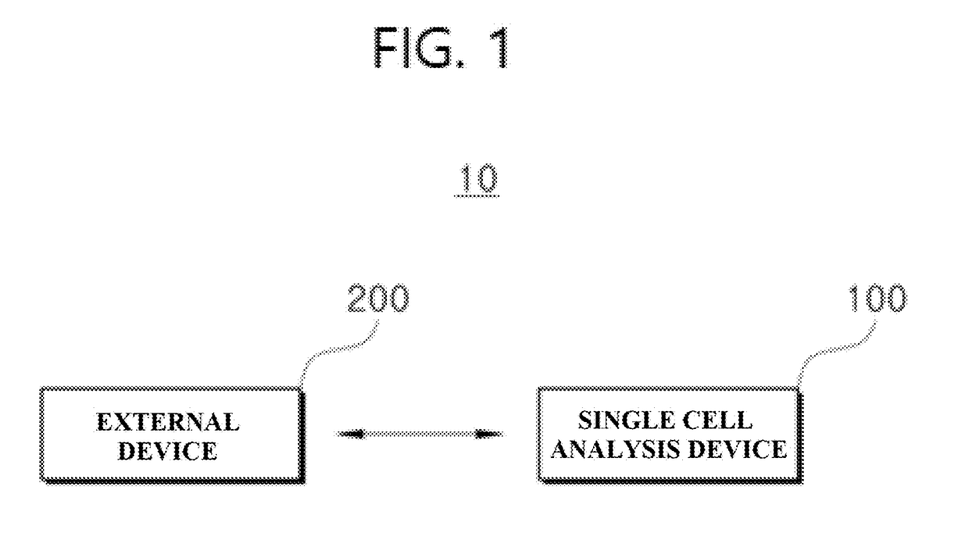
FIG. 1 is a schematic block diagram of a single cell analysis system according to various embodiments of the present invention.

FIG. 1 is a schematic block diagram of a single cell analysis system according to various embodiments of the disclosure.

Referring to FIG. 1, a single cell analysis system 10 includes a single cell analysis device 100 and an external device 200. Each node may exchange data with a different node. Each node may be connected via a network.

A single cell analysis device 100 according to various embodiments of the present invention is a device capable of providing a single cell analysis result for a tumor using artificial intelligence. The single cell analysis device 100 may transmit or receive analysis result data to another device connected by wire or wirelessly. The single cell analysis device 100 may receive various types of data in the single cell analysis system 10, and provide the data through an application or a web service.

The external device 200 according to various embodiments of the present invention may be a device that transmits single-cell data for a tumor of a particular patient to the single cell analysis device 100. For example, the external device 200 may be a terminal, a server, a desktop, or the like for uploading single-cell RNA sequencing data on each of a plurality of cells constituting a tumor sample of a particular patient to the single cell analysis device 100.

According to another embodiment, the external device 200 may be a device that receives analysis result data from the single cell analysis device 100. For example, the external device 200 may be a device of a laboratory server, a desktop, a terminal, or the like which receives single cell analysis result data for tumors analyzed through the single cell analysis device 100. That is, the external device 200 includes any device connected to a single cell analysis device via a network to transmit and receive various types of data.

Figure 2:
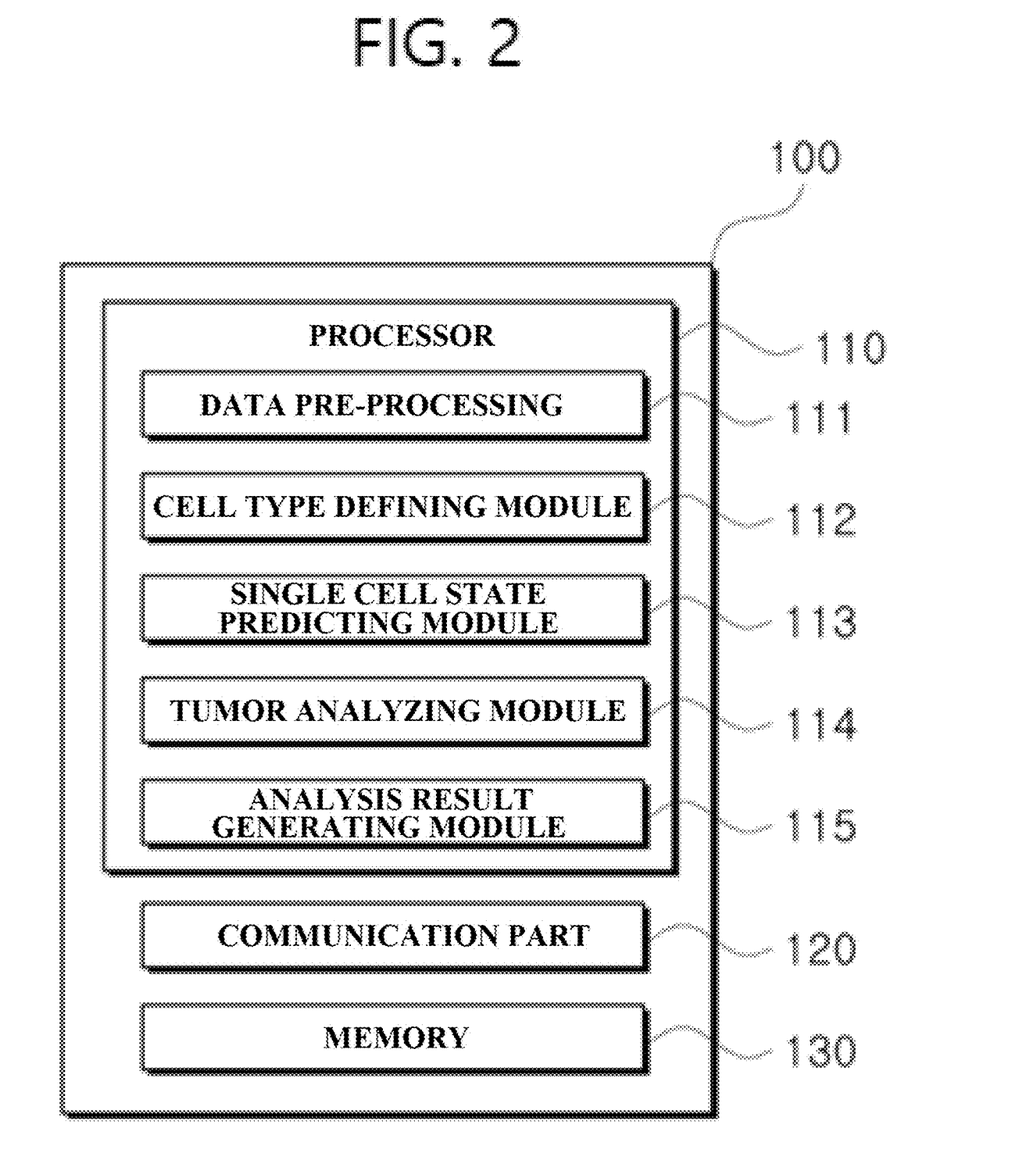
FIG. 2 is a schematic block diagram of a single cell analysis device according to various embodiments of the present invention.

FIG. 2 is a schematic block diagram of a single cell analysis device according to various embodiments of the present invention.

Referring to FIG. 2, a single cell analysis device 100 may include a processor, a communicator, and a memory, but aspects of the present invention are not limited thereto. Each node may exchange data with a different node. Each node may be directly electrically connected to other nodes or connected to other nodes via a network by wire or wirelessly. The single cell analysis device 100 according to the present invention may perform a function of the processor itself via a separate server.

The single cell analysis device 100 according to various embodiments of the present invention is a device that analyzes data on a tumor taken from a patient on the basis of a single cell unit and provides a result of the analysis. The single cell analysis device 100 may be a server that operates and manages an analysis result providing service platform targeted to hospitals (or doctors) for providing a clinically cancer-related test and an analysis service and pharmaceutical companies for providing a clinical trial support service.

Referring to FIG. 2, the processor 110 includes: a data pre-processing module 111, a cell type defining module 112, a single cell state predicting module 113, a tumor analyzing module 114, and an analysis result generating module 115. The processor 110 is configured to classify a single-cell phenotype of a tumor of each patient's cancer based on single-cell data on tumors of particular patients' cancers, the data obtained through the communication part 120, and provides a result data on a predicted grade. Here, the processor 110 may provide the result data including data on a new subtype, and provide data in the form of reports so that a doctor in a hospital can easily give explanation to a patient or the patient can easily figure out the result by his or her own.

The processor 110 may include individual modules 111 to 115. Here, the individual modules 111 to 115 may refer to functional blocks according to functions of the processor 110. Specifically, the individual modules 111 to 115 may correspond to function blocks named according to the functions of the processor 110.

The processor 110 according to an embodiment of the present invention may be implemented by an algorithm for controlling operations of elements in the single cell analysis device 100, the memory 130 for storing data on a program reproduced by an algorithm, and at least one functional block for performing the above operations using data stored in the memory 130. In this case, the processor 110 and the memory 130 may be implemented by separate chips. Alternatively, the processor 110 and the memory may be implemented as a single chip.

In order to implement various embodiments according to the present invention, described with reference to FIGS. 3 to 7A and FIG. 8 below, in the single cell analysis device 100, the processor 110 may control one of the aforementioned elements or two or more of the aforementioned elements in combination.

The communication part according to an embodiment may include one or more components that enable communication with an external device (e.g., the external device of FIG. 1), and may include, for example, at least one of a broadcast receiving module, a wired communication module, a radio communication module and a short-range communication module.

The wired communication module may include various types of wired communication modules such as a local area network (LAN) module, a wide-area network (WAN) module or a value added network (VAN) module, and may also include cable communication modules, such as a universal serial bus (USB), a high definition multimedia interface (HDMI), a digital visual interface (DVI), recommended standard 232 (RS-232), power line communication, or plain old telephone service (POTS).

In addition to a Wifi module and a wireless broadband module, the wireless communication module may include a radio communication module that supports various radio communication schemes, such as a global system for mobile communication (GSM), a code division multiple access (CDMA), a wideband Code Division Multiple Access (WCDMA), a universal mobile telecommunications system (UMTS), a time division multiple access (TDMA), a long term evolution (LTE), 4G, 5G, and 6G.

The short-range communication module is for short range communication, and may support short-range communication by using at least one of Bluetooth™, Radio Frequency Identification (RFID), Infrared Data Association (IrDA), Ultra Wideband (UWB), ZigBee, short-range Communication (NFC), Wireless-Fidelity (Wi-Fi), Wi-Fi Direct, and Wireless Universal Serial Bus (USB) technologies.

An output part (not shown) according to an embodiment is to generate a visual, auditory, or tactile output and may include a display part (not shown). The display part may be interlayered or integrally formed with a touch sensor to implement a touch screen. The touch screen may serve as a user input part for providing an input interface between the device and a user, and may provide an output interface between the device and the user.

The display part displays (outputs) information processed by the single cell analysis device 100. For example, the display part may display execution screen information of an application program (e.g., an application) driven by the single cell analysis device 100, or information on a user interface (UI) or graphic user interface (GUI) according to the execution screen information.

According to an embodiment, the memory 130 may store data supporting various functions of the single cell analysis device 100 and a program for operation of the processor 110, may store input/output data (e.g., image, video, etc.), and may store a plurality of application programs or applications running on the single cell analysis device 100, and data and instructions for operation of the single cell analysis device 100. At least one of these applications may be downloaded from an external server via wireless communication.

The memory 130 may include at least one type of storage medium of the following: a flash memory type, a hard disk type, an SSD type (Solid State Disk type), an SDD type (Silicon Disk Drive type), a multimedia card micro type, and a card type memory (e.g., SD or XD memory), a random access memory (RAM), a static random access memory (SRAM), a read-only memory (ROM), an electrically erasable programmable read-only memory (EEPROM), a programmable read only memory (PROM), a magnetic memory, a magnetic disk, and an optical disk. In addition, the memory may be a database which is separate from the single cell analysis device 100 but connected thereto by wire or wirelessly.

At least one component may be added or deleted to correspond to the performance of the components shown in FIG. 2. It will also be readily appreciated by those skilled in the art that the positioning of the components may be varied in response to the performance or structure of the device.

Meanwhile, each component shown in FIG. 2 refers to a software and/or hardware component such as Field Programmable Gate Array (FPGA) and Application Specific Integrated Circuit (ASIC).

Figure 3:
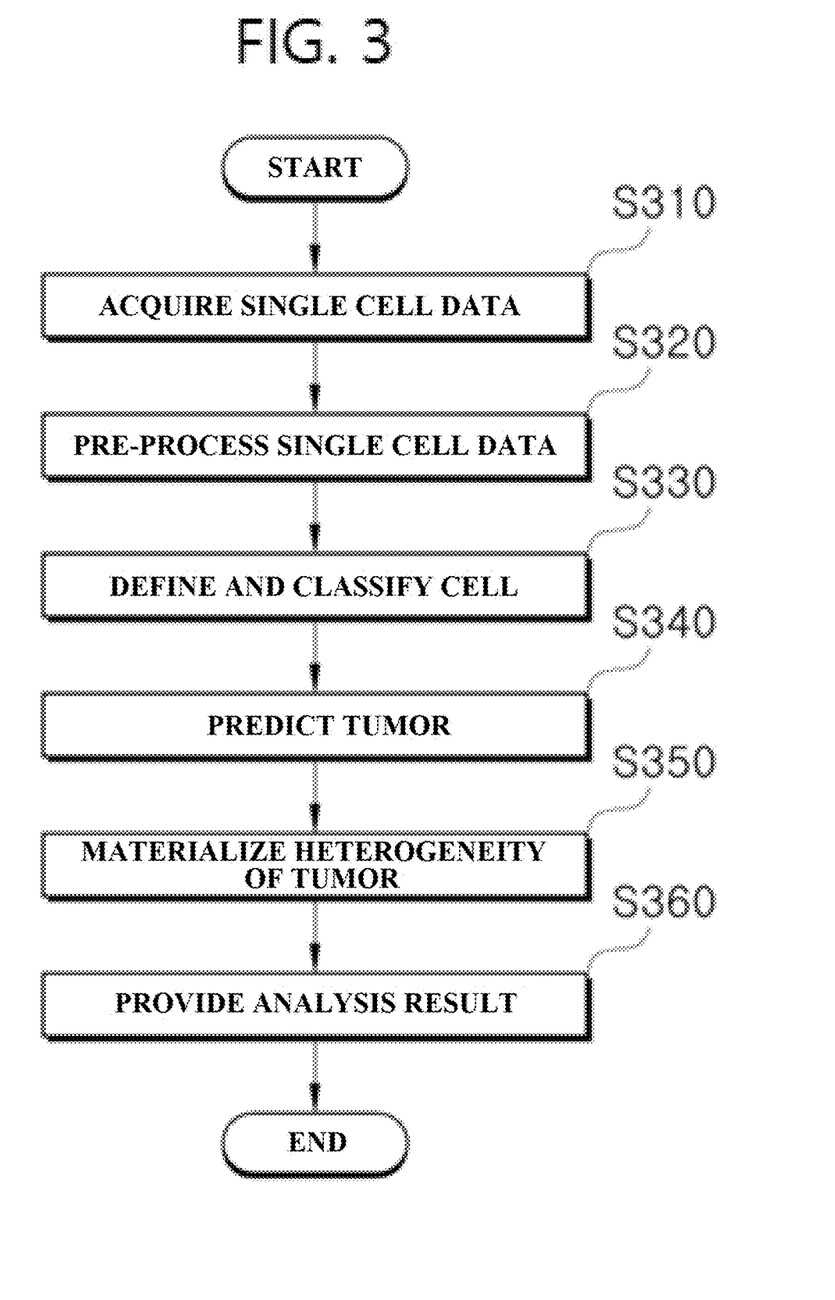
FIG. 3 is a schematic flowchart of a method for single cell analysis of a tumor using artificial intelligence according to various embodiments of the present invention.

FIG. 3 is a schematic flowchart of a method for analyzing a single cell of a tumor using artificial intelligence according to various embodiments of the present invention.

In operation S310, a processor (e.g., the processor 110 in FIG. 2) may acquire single-cell data on a tumor of a particular patient through a communication part (for example, the communication part 120 in FIG. 2). The single-cell data on the tumor of the particular patient may include RNA sequencing data on each single cell of multiple cells present in the tumor taken from the particular patient. The processor allocates and stores the single-cell data on the tumor of the particular patient, acquired through the communication part, and data on a result of analyzing the single cell data to the particular patient.

In operation S320, the processor may pre-process the single cell data on the tumor through a single-cell data pre-processing module (e.g., the single-cell data pre-processing module 111 of FIG. 2). The single cell data pre-processing process may be classified largely into two types. For example, the single-cell data pre-processing process may include a quality control process and an error correction process. According to an embodiment, if necessary, the single-cell data pre-processing module may pre-process the data by performing a process other than the aforementioned process. A detailed description of the pre-processing process is provided below in FIG. 5.

In operation S330, the processor may classify a type of the single cell based on the data pre-processed by the cell type defining module (e.g., the cell type defining module 112 of FIG. 2). Based on previously defined phenotypes for single cells and phenotypes newly acquired through learning, the cell type defining module may define the type of the single cell of the particular patient's tumor and classify the type as one of grouped types.

According to an embodiment, the phenotypes derivable from a tumor RNA of the particular patient may include at least one of a subtype, a grade, aggressiveness, enriched pathways, a biological marker, a copy number variation (CNV), and a single nucleotide variant (SNV), but aspects of the present invention is not limited thereto.

In operation S340, the processor may predict a tumor subtype and a grade of the particular patient by using a single cell state predicting module (e.g., the single cell state predicting module 113 of FIG. 2). This may correspond to a process for more accurately predicting a type of cancer based on a result of analyzing a tumor on the basis of a single cell unit.

In operation S350, the processor may materialize heterogeneity of the tumor of the particular patient through a tumor analyzing module (e.g., the tumor analyzing module 114 of FIG. 2). This refers to a process in which a single cell analysis device (e.g., the single cell analysis device 100 in FIG. 1) materializes the heterogeneity of the whole cancer tumor sample based on a single cell subtype predicted through the machining model and a grade thereof.

In operation S360, the processor may report and provide an analysis result of the tumor of the particular patient through the analysis result generating module (e.g., the analysis result generating module 115 shown in FIG. 2). For example, the analysis result may be data, and the analysis result data may be provided in the form of a downloadable report-type file. In addition, the analysis result data may include data on a type of each tumor sample and a treatment plan for a cancer which each individual patient among particular patients suffer. According to one example, the analysis result generating module may provide at least one of a current status result corresponding to the heterogeneity of the tumor of the particular patient, a metastasis prediction result, and a treatment drug result, by including the same in the content of a report.

According to an embodiment, the analysis result generating module may learn by itself or preset which information to include in the content of the report. The data generated by the analysis results generating module includes data that is meaningful from a customer's perspective. For example, the analysis result data may include a subtype of a single cell, an extent of occupancy of the subtype in the entire tumor, a grade for the single cell, an extent of occupancy of the grade in the entire tumor, heterogeneity information, and the like. In another example, the analysis result data may include personal information corresponding to a particular patient, tissue sample information of the particular patient analyzed, overall information on a cancer analyzed, cell-group-specific information analyzed for the particular patient, and the like. The analysis result data is not limited to the above examples, and information to be included may be set by a user using the single cell analysis device or maybe adaptively set to correspond to a cancer of a particular patient.

Figure 4:
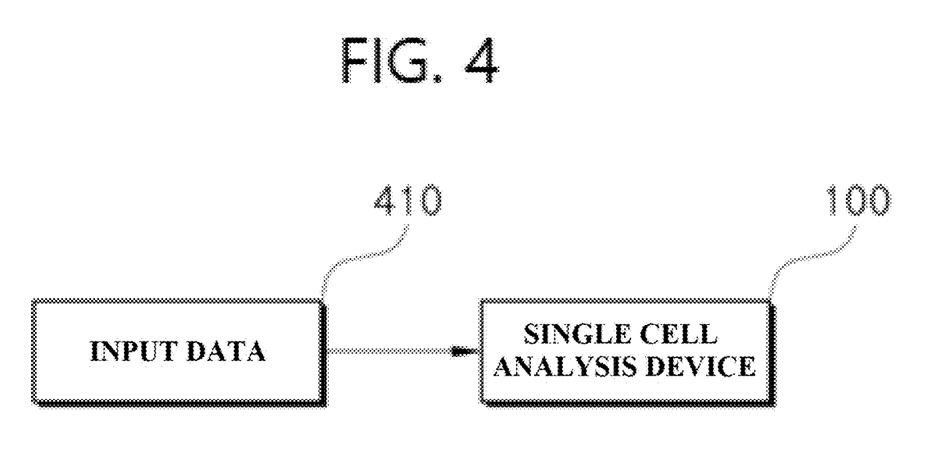
FIG. 4 is a schematic block diagram of a process for obtaining single-cell data on a tumor of a particular patient according to various embodiments of the disclosure.

FIG. 4 is a schematic block diagram of a process for acquiring single-cell data on a tumor of a particular patient according to various embodiments of the disclosure.

Referring to FIG. 4, a processor (e.g., the processor 110 of FIG. 2) may acquire single cell data on a tumor of a particular patient through a communication part (e.g., the communication part 120 of FIG. 2). In FIG. 4, input data 410 corresponds to single cell data.

According to an embodiment, single cell data on a tumor of a particular patient may include RNA sequencing data on each single cell out in multiple cells present in the tumor taken from the particular patient. The processor allocates the single-cell data on the tumor of the particular patient, which is acquired through the communication part, and the data resulting from analyzing the single-cell data to the particular patient, and stores the same.

The single cell data on the tumor of the particular patient according to an embodiment may include omics data. "Omics" may refer to a field based on a collective dataset for individual gene, transcript, protein, and metabolite studies. The data addressed by ohmic includes large-scale and large-capacity data, and may be referred to as ohmic data. For example, the genome collectively refers to an entire genome sequence and genetic information inherent therein. In another example, the transcript may collectively refer to a transcript expressed in a particular cell. In another example, the epigenomic includes the collective data on various modifications applied to DNA and histone proteins involved in transcriptional regulation of genes without changing the DNA sequence due to epigenetic modification. In another example, the proteome refers to the whole set of proteins expressed in a particular cell or tissue. In yet another example, the interactome may refer to the whole set of interactions between proteins observed directly or indirectly in a particular cell or tissue. Single cell data on a tumor of a particular patient of the present invention may include, but is not limited to, the ohmic data in the aforementioned example.

Single cell data on a tumor of a particular patient according to an embodiment may correspond to data from single cell RNA sequencing within multiple cells constituting a tumor sample, which is collected from the particular patient through biopsy at a hospital or pharmaceutical company, through an external institution (e.g., bioinformatics core, sequencing company, etc.)

The single cell RNA sequencing according to an embodiment differs from bulk sequencing. For example, tumor heterogeneity may not be taken into account in performing bulk sequencing. That is, by bulk sequencing, RNA of cancer cells with the same or different genetic and epigenetic traits as immune and stromal cells constituting a tumor may be mixed and analyzed regardless of the heterogeneity of the tumor. In contrast, the RNA sequencing utilized in the present invention allows the separate analysis of RNA in a single cell of a tumor, and thus, tumor heterogeneity may be considered. That is, assuming that there are 100 cells, determining the extent of RNA expression in consideration of the transcripts of single cells, and sequencing the heterogeneity expressed in each single cell individually may correspond to single cell RNA sequencing. Such single cell RNA sequencing may be performed through a variety of processes, e.g., a process in which cDNA is amplified and analyzed to perform Illumina NGS sequencing. Receiving single-cell RNA sequencing data according to the present invention is not receiving specific data input through a process, but may be any RNA sequencing data on single-cells analyzed by an external institution.

Figure 5:
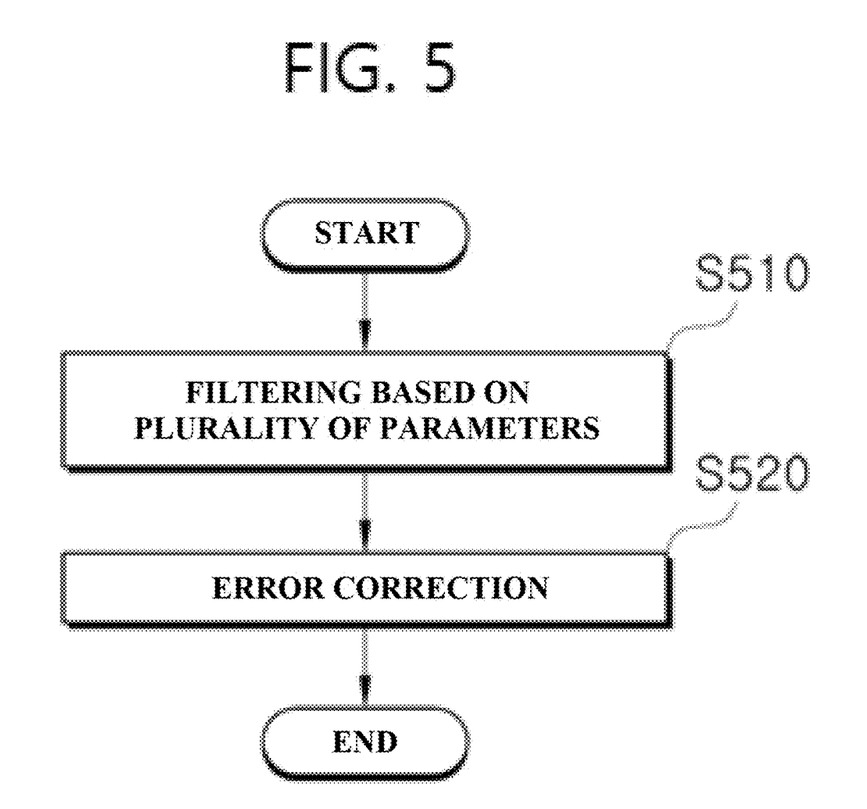
FIG. 5 is a flowchart of a data pre-processing process of a single cell analysis device according to various embodiments of the present invention.

FIG. 5 is a flowchart of a data pre-processing process of a single cell analysis device according to various embodiments of the present invention.

In operation S510, a data pre-processing module (e.g., the data pre-processing module 111 shown in FIG. 2) may filter single-cell data based on a plurality of parameters. Such a filtering process may correspond to a quality control process.

The data pre-processing module according to an embodiment may filter meaningful data out of single-cell data by utilizing the plurality of parameters. For example, the parameters may include a parameter based on an amount of data. The parameter related to the amount of data may be a parameter for filtering a single cell of which single cell data contains too little or too much information. In another example, the parameters may include a parameter based on the quality of the data. The parameter related to the quality of the data may be a parameter for filtering an already dead single cell or a dying single cell. In another example, the parameters may include a parameter related to duplication of data. The parameter related to the duplication of data may be a parameter for removing possibly duplicatedly read data. As such, the data pre-processing module may filter data that may have an insignificant bias in single cell data.

In operation S520, the data pre-processing module may perform an error correction process. This may correspond to a batch error correction process. That is, the data pre-processing module may compare a part of data, which may differ from other data depending on an environment, a sequencing machine, a library, or the like in which the sample of a particular patient was present, with the other data.

The data pre-processing module according to an embodiment may perform a process of correcting acquired single-cell data on a tumor of a particular patient in comparison with single cell data on another tumor, which is stored in a memory (e.g., the memory 130 in FIG. 2). The data pre-processing module according to an embodiment may perform a process independently or in cooperation with a cell type defining module (e.g., the cell type defining module of FIG. 2), and may be designed to cooperate to perform a function required to sequentially the cell type defining process sequentially after preprocessing the single cell data.

Figure 6:
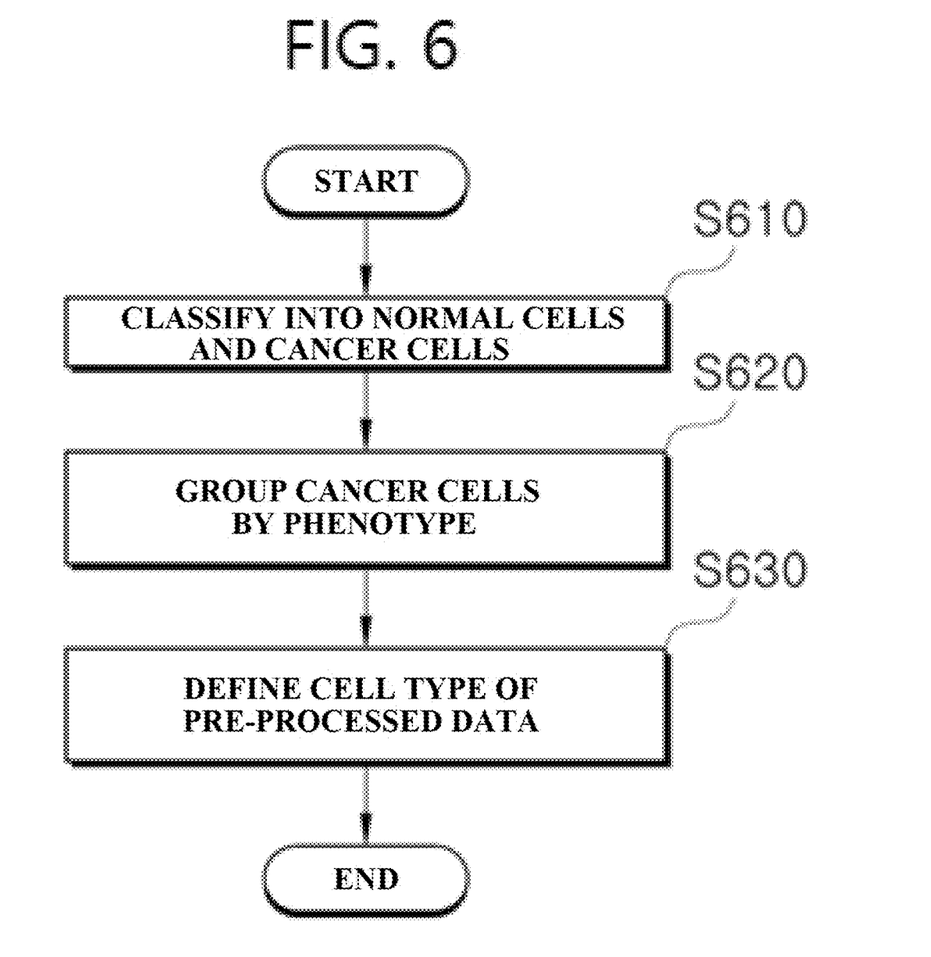
FIG. 6 is a schematic block diagram of a cell type defining process of a single cell analysis device according to various embodiments of the present invention.

FIG. 6 is a schematic block diagram of a cell type defining process of a single cell analysis device according to various embodiments of the present invention.

In operation S610, a processor (e.g., the processor 110 in FIG. 2) may distinguish between a normal cell and a cancer cell by using a cell type defining module (e.g., the cell type defining module 112 in FIG. 2).

In distinguishing a cell type according to an embodiment of the present invention, cell types are divided into a normal cell (e.g., an epithelial cell, an immune cell, etc.) and a cancer cell that can be collected only from a cancer patient (for example, a cancer epithelial cells, a stomach cell, and the like). Here, a genomic phenotype in a particular single cell may vary depending on which cell the single cell is.

In operation S620, the cell type defining module performs a process of grouping cancer cells by phenotype. At this point, the cell type defining module may group cancer cells by phenotype based on an expression degree of a gene.

According to an embodiment, a process in which the cell type defining module defines a cell type includes a process of grouping cells having similar phenotypes by clustering. Then, the cell type defining module checks an expression degree of a cell-specific gene (e.g., epithelial cell adhesion molecule (EPCAM) and the like) to determine a group which the corresponding cell group or single cell belongs to.

In operation S630, the cell type defining module performs a process of defining a cell type of the pre-processed data. The cell type defining module may map the grouped data to cancer cell type standard data to define the cell type of the pre-processed data.

According to an embodiment, the cell type defining module may map cell type data of data previously defined as a standard to obtained single-cell data to derive a cell type. Defining a cell type is performed by the cell type defining modules because functions and phenotypes vary from cell to cell. For example, since it may not be meaningful to analyze cancer cells of a particular patient with immune cells of other patients, the single cell analysis device of the present invention (e.g., the single cell analysis device 100 in FIG. 1) clearly defines a cell type and performs analysis on the basis of a single cell unit.

The single cell analysis device according to an embodiment can separate common cells and cancer cells contained in a tumor and group cancer cells to obtain more accurate and significant information. This takes the advantage of the fact that analysis is performed more accurately when only cancer cells are analyzed separately from normal cells. If even detailed phenotypes in the cancer cells are analyzed, more accurate and meaningful information may be derived. In the single cell analysis device, it is also possible to compensate an error that may occur in the course of taking a tumor sample during the analysis. For example, in performing histology for tumor sampling, it may fail to target and accurately take cancer cells. In this case, the single cell analysis device of the present invention may perform a process of clearly distinguishing between normal cells and cancer cells.

Figure 7A:
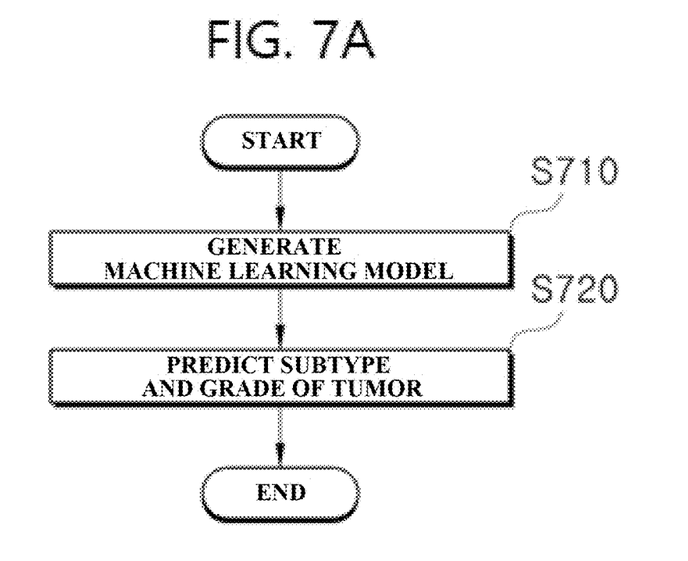
FIGS. 7A and 7B are a flowchart and an illustration of a process of operating a single-cell state predicting module of a single cell analysis device according to various embodiments of the present invention.
Figure 7B:
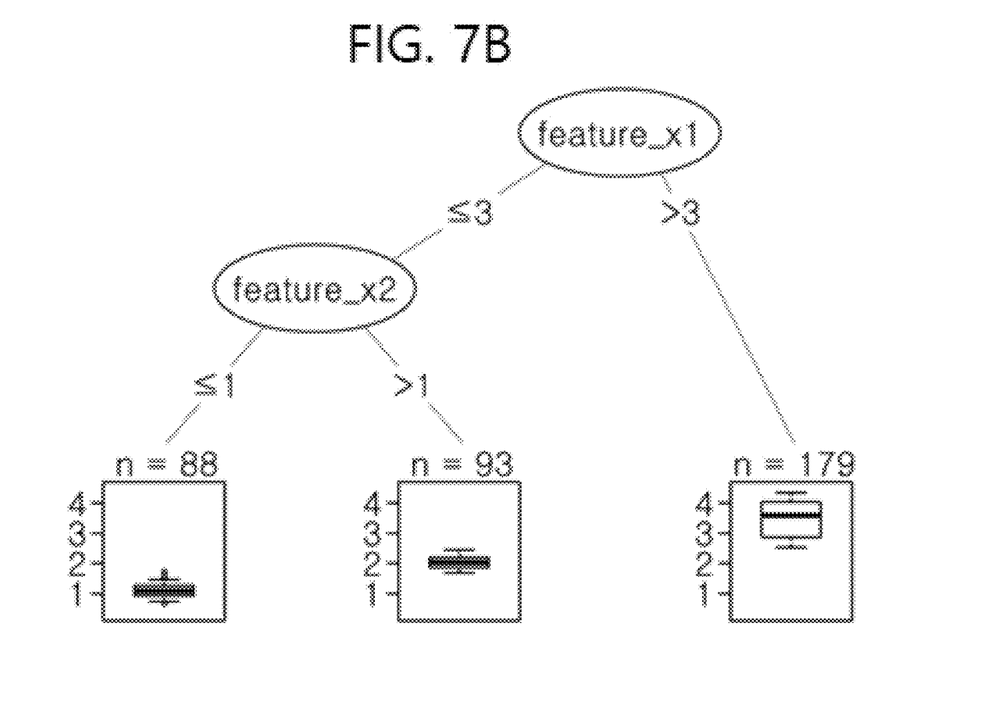

FIGS. 7A and 7B are a flowchart and an illustration of a process of operating a single-cell state predicting module of a single cell analysis device according to various embodiments of the present invention.

Referring to FIG. 7A, in operation S710, a processor (e.g., the processor 110 in FIG. 2) may generate a machining model through a single-cell state predicting module (for example, the single cell state predicting module 113 in FIG. 2). However, the process of generating a model through the single-cell state predicting module may be replaced with obtaining a pre-generated model. Regarding the machining model, it will be described below with the example shown in FIG. 7B.

In operation S720, the single cell state predicting module may perform a process of predicting a subtype of a tumor and a grade. The single cell state predicting module may sequentially perform a process for predicting a subtype of a single cell and a process of predicting a grade based on the cell.

Regarding the subtype of the cancer cell and the grade, it will be described by taking an example of breast cancer. The breast cancer has four unique subtypes depending on gene expression. The subtypes are Luminal A, Luminal B, HER2, and TNBC, and the prognosis by gene expression may vary depending on a subtype. For example, Luminal A has the best prognosis and has a high rate of estrogen and progesterone receptor expression, and there are some cases where anticancer treatment is omitted. In another example, Luminal B has a relatively poor prognosis compared to Luminal A, and has a low rate of estrogen and progesterone receptor expression, and Luminal B is known to be a case where anticancer chemotherapy is required. In yet another example, for HER2 often, it is often, although not common, to show a relatively poor prognosis, and targeted treatment is required in most cases. The single cell state predicting module of the present invention may assist in targeting a subtype to perform a suitable treatment in consideration of more accurate diagnosis and consistent prognosis.

With respect to the grade of cancer cell, a physician generally considers a grade of cancer cell as an element that can determine a prognostic factor of breast cancer. The grade may be divided into well differentiated (1), moderately differentiated (2), and poorly differentiated (3). In this case, the greater the number, the worse the prognosis. When the grade is divided into G1, G2, and G3, the prognosis factor of G1 is superior to G2, so a treatment method may be determined in consideration of each grade. The single cell state predicting module of the present invention may assist in targeting this grade and determining a more suitable treatment method.

Referring to FIG. 7B, the single-cell state predicting module may generate a model by random forest classification. This is to perform supervised learning based on a subtype of a cancer cell and a grade thereof, which have already been labeled, and may be a method of making a large number of decision trees to determine a subtype of cancer as the most likely results in the tree.

The single cell state predicting module according to an embodiment may use a model that has been repeatedly trained by comparing pathological test result data on a tumor labeled by using a gene of a single cell as a feature with a preset threshold. Referring to FIG. 7B, the single cell state predicting module may check information obtainable from covariance between individual features and a target label during operation in the decision tree. At this point, the single cell state predicting module performs sub-grouping on the individual features according to a preset threshold. The single cell state predicting module may repeat the above process until a subgroup in the decision tree corresponds to one target label. In this case, an operation such as overfitting may be added, and the most frequent result value among result values corresponding to a dataset may correspond to a subtype of a single cell and a grade thereof.

Figure 8:
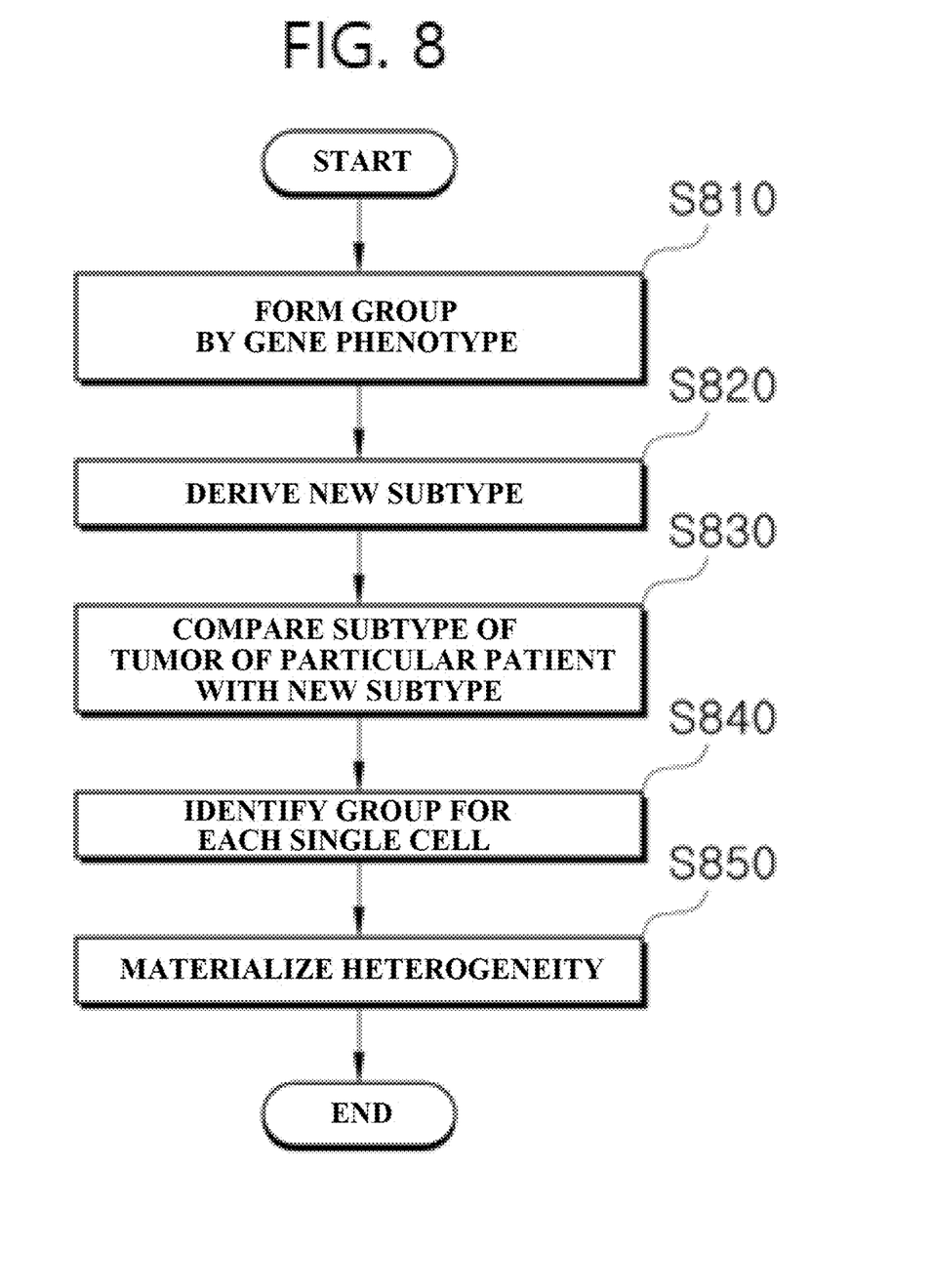
FIG. 8 is a flowchart of a heterogeneity materializing process through a tumor analyzing module of a single cell analysis device according to various embodiments of the present invention.

FIG. 8 is a flowchart of a heterogeneity materializing process through a tumor analyzing module of a single cell analysis device according to various embodiments of the present invention.

Referring to FIG. 8, in operation S810, a processor (e.g., the processor 110 in FIG. 2) may identify a group according to a gene phenotype by a tumor analyzing module (e.g., the tumor analyzing module 114 in FIG. 2). A single cell analysis device according to an embodiment (e.g., the single cell analysis device 100 in FIG. 1) may cluster respective single cell data in various cells of tumor of cancer cells of many patients to form a group of cells having similar gene phenotypes. Significant groups among groups formed in the above-described manner may be selected and defined and classified as new subtypes if they are clearly distinguishable from existing gene phenotypes. This may correspond to grouping gene phenotypes through unsupervised clustering of single cell data. A tumor analyzing module according to an embodiment identifies a group from a phenotype derivable according to RNA expression of a tumor cell through the process as shown in FIG. 7A.

According to an embodiment, in operation S820, the tumor analyzing module may perform a process of deriving a new subtype, distinguishable from existing subtypes, according to a formed group. Here, the subtype is exemplary and is merely one example of a new phenotype. In operation S830, the tumor analyzing module may perform a process of analyzing a phenotype of a tumor of a particular patient in comparison with the new phenotype. In operation S840, the tumor analyzing module may perform a process of identifying a group for each single cell based on the phenotype of the tumor of the particular patient. This may mean that, when a new phenotype is derived, the phenotype of the tumor of the particular patient is analyzed in comparison with the new phenotype. When a new phenotype is derived, a gene phenotype of a single cell of the particular patient's tumor is classified as a new phenotype. That is, because a different prognosis from the existing one can be observed and predicted for the particular patient due to the new phenotype, the analysis device may derive and classify the new phenotypes through single cell analysis and enable an appropriate treatment to be performed.

If the single cell corresponds to a new subtype, the tumor analyzing module according to an embodiment acquires information by calculating a result of a prediction model of the particular patient's tumor. This is far from the classic manner of classifying a cancer subtype, and it includes a process of identifying a newly classified subtype, in addition with an existing subtype, to facilitate responding to the subtype.

In operation S850, the tumor analyzing module may perform a process of materializing heterogeneity by analyzing at least one or more phenotypes derivable from RNA expression of the tumor of the particular patient according to the phenotype of the group.

The heterogeneity according to an embodiment refers to different characteristics of cell configuration that makes up the tumor of the particular patient. In particular, during cell division, cancer cells having different genetic and epigenetic variations, i.e., cancer cells with different phenotypes may be present in one tumor. Existing pathological diagnostics match one diagnostic name to one patient. With the single cell analysis method of the present invention, single cell data may be used to match two or more phenotypes for one patient. That is, the single cell analysis device of the present invention may match the diagnostic name for each cell or each cell group. This diagnostic name is provided by referencing a result of a prediction model and identifying a gene phenotype expressed in a corresponding subtype.

Figure 9:
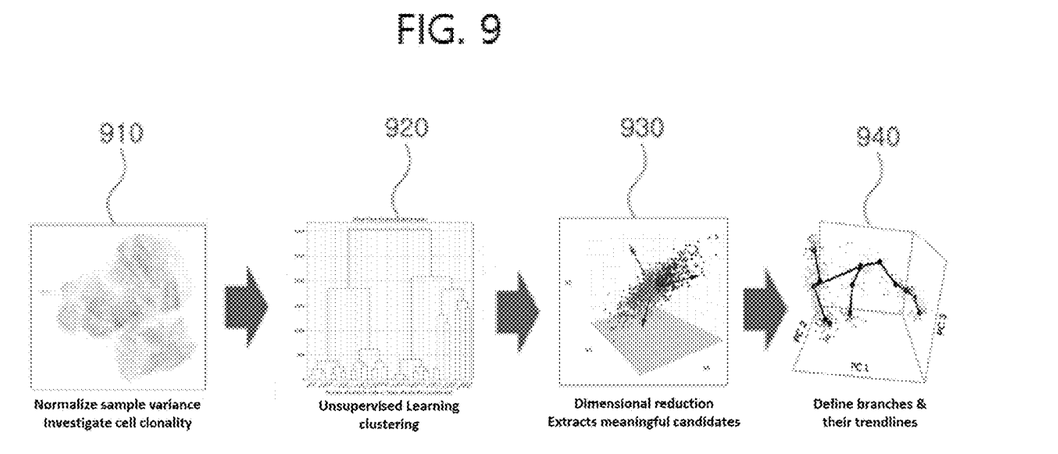
FIG. 9 is an illustration of a heterogeneity materializing process through a tumor analyzing module of a single cell analysis device according to various embodiments of the present invention.

FIG. 9 is an illustration of a heterogeneity materializing process by a tumor analyzing module of a single cell analysis device according to various embodiments of the present invention. Referring to FIG. 9, the heterogeneity materializing process by the tumor analyzing module in FIG. 8 (e.g., tumor analyzing module 114 shown in FIG. 2) may be seen. Operations S810 to S840 in FIG. 8 may be described through operations 910 and 920 in FIG. 9, and operation S850 in FIG. 8 may be described through operations 920 and 940 in FIG. 9.

Referring to FIG. 9, the tumor analyzing module may predict a subtype and a grade by performing precise subclustering analysis. Considering that each cancer cell of each patient has a very different phenotype, the tumor analyzing module according to an embodiment increase a sample-to-sample variance. In this case, it may be difficult to ascertain a common pattern in cells of different patients, so the tumor analyzing module performs a process of normalizing the covariance of the sample, as shown in operation 910. Then, the tumor analyzing module may determine whether normalization is appropriate by determining whether clonality of all single cells is found. The tumor analyzing module then clusters data through non-map learning, as shown in operation 920.

The tumor analyzing module according to an embodiment may perform a dimension reduction process before or simultaneously with the clustering. In operation 930, the tumor analyzing module may determine which dimension to utilize according to a covariance of features, and this operation may be performed before the clustering. Then, the tumor analyzing module may discover groups of biologically significant cells, and newly defined groups may be grouped into phenotypes and genotypes to map a subtype and grade.

The tumor analyzing module according to an embodiment can materialize heterogeneity of a single cell in a tumor of a particular patient, thereby predicting metastasis information of that subtype. This may be performed on the basis of information ascertained using parameters that have been used as references. That is, the tumor analyzing module of the present invention may identify, through existing models, a phenotype derivable in a particular patient's RNA expression of a tumor predicted through machining, and if an analysis result is a new phenotype that does not belong to the existing phenotypes, the tumor analyzing module may process data to provide metastasis information and appropriate treatment information for the new phenotype.

The tumor analyzing module according to an embodiment may predict suitable drugs and treatment methods for a particular patient's tumor. This may include a process of integrating information learned through the existing models and information on grouping into the new phenotype to make a determination through the tumor analyzing module. Information on drugs and treatment methods may be stored in a memory (e.g., the memory 130 in FIG. 2), or may be updated in real time through a separate database. In addition, the single cell analysis device according to various embodiments of the present invention (e.g., the single cell analysis device 100 in FIG. 1) may repeatedly perform learning and predict and recommend at least one drug and treatment method in consideration of information on subtype, grade, prognosis, and the like.

Meanwhile, the disclosed embodiments may be implemented in the form of a recording medium storing instructions executable by a computer. The instructions may be stored in the form of program codes, and when executed by a processor, generate a program module to perform operations of the disclosed embodiments. The recording medium may be implemented as a computer-readable recording medium.

The computer-readable recording media include any type of recording medium on which instructions readable by a computer are stored. For example, there may be a read only memory (ROM), a random access memory (RAM), a magnetic tape, a magnetic disk, a flash memory, an optical data storage device, and the like.

As above, the disclosed embodiments have been described with reference to the accompanying drawings. It will be understood by those skilled in the art that various changes in form and details may be made therein without departing from the spirit and scope of the present invention as defined by the appended claims. Therefore, the foregoing embodiments should be understood as being illustrative but not limitative purposes.

The invention claimed is:

1. A single cell analysis device for analyzing a tumor using artificial intelligence, the device comprising:
    a memory;
    a communication part; and
    a processor,
    wherein the processor is configured to:
    acquire single cell data on a tumor of a particular patient through the communication part;
    pre-process the single cell data on the tumor through a data pre-processing module;
    classify a type of the single cell based on gene expression patterns from the pre-processed data, through the cell type defining module;
    predict, using a trained machine learning model, a phenotype, including a cancer subtype or grade, based on RNA expression of the tumor of the particular patient, using a machine learning model trained on labeled single-cell transcriptomic data, through the single-cell state predicting module;
    materialize phenotypic heterogeneity of the tumor of the particular patient by performing unsupervised clustering through the tumor analyzing module; and
    report and provide an analysis result of the tumor of the particular patient through an analysis result generating module.

2. The single cell analysis device of claim 1,
    wherein the single cell data on the tumor of the particular patient comprises RNA sequencing data on each single cell in multiple cells present in the tumor taken from the particular patient, and
    wherein the processor is configured to allocate, to the particular patient, single cell data on the tumor of the particular patient, which is acquired through the communication part, and data on a result of analyzing the single cell data.

3. The single cell analysis device of claim 2, wherein the data pre-processing module is configured to:
filter the single cell data based on a plurality of parameters; and
correct the single cell data in comparison with single cell data on another tumor, which is stored in the memory,
wherein the plurality of parameters is parameters related to an amount of data, a quality of data, or a duplication of data.

4. The single cell analysis device of claim 3, wherein the cell type defining module is configured to:
distinguish between normal cells and cancer cells based on the single cell data;
group the cancer cells by phenotype based on a expression degree of gene; and
map the grouped data to cancer cell type standard data to define a cell type of the pre-processed data.

5. The single cell analysis device of claim 4, wherein the single cell state predicting module is configured to predict a derivable phenotype in RNA expression of the tumor by using a machining prediction model.

6. The single cell analysis device of claim 5, wherein the single cell state predicting module is configured to predict a state of the single cell by using a model that has been repeatedly trained by comparing a pathological test result of a tumor labeled with a gene of a single cell used as a feature with a predetermined threshold value.

7. The single cell analysis device of claim 6, wherein the tumor analyzing module is further configured to:
group single cells by gene phenotype through unsupervised clustering of the single-cell data;
derive a new phenotype distinguishable from an existing phenotype according to the formed group; and
in response to deriving the new phenotype, analyze the phenotype of the tumor of the particular patient in comparison to the new phenotype.

8. The single cell analysis device of claim 7, wherein the analysis result generating module is configured to report and provide at least one of a current status result, a metastasis prediction result, and a therapeutic drug result corresponding to heterogeneity of the tumor of the particular patient.

9. The single cell analysis device of claim 2, wherein the phenotype derivable from the RNA expression of the tumor of the particular patient comprises at least one of a subtype, a grade, an aggressiveness, an enriched pathway, a biological marker, a copy number variation (CNV), and a single nucleotide variant (SNV).

10. A method of analyzing a single cell of a tumor using artificial intelligence, the method comprising:
acquiring single cell data on a tumor of a particular patient through a communication part;
pre-processing single cell data on the tumor through a data pre-processing module;
classifying a type of the single cell based on the pre-processed data through a cell type defining module;
predicting, using a trained machine learning model, a phenotype, including a cancer subtype or grade, based on RNA expression of the tumor of the particular patient, using a machine learning model trained on labeled single-cell transcriptomic data, through the single-cell state predicting module;
materializing heterogeneity of the tumor of the particular patient through a tumor analyzing module; and
generating and providing a report on an analysis result of the tumor of the particular patient through an analysis result generating module.

* * * * *